United States Patent [19]

Cruea et al.

[11] Patent Number: 5,028,315
[45] Date of Patent: Jul. 2, 1991

[54] FROTH FLOTATION APPARATUS AND METHOD

[75] Inventors: Ronald D. Cruea, Taipai, Taiwan; Michael F. Kinne, Trenton, Ohio

[73] Assignee: The Black Clawson Company, Middletown, Ohio

[21] Appl. No.: 448,439

[22] Filed: Dec. 11, 1989

[51] Int. Cl.⁵ .......................... B03D 1/02; B03D 1/16
[52] U.S. Cl. ..................................... 209/164; 209/169; 210/703; 210/221.1; 261/84; 261/92; 162/4; 162/5
[58] Field of Search ....................... 209/164, 169, 170; 210/221.1, 221.2, 703, 704, 705; 162/4, 5, 6, 7; 261/84, 92

[56] References Cited

U.S. PATENT DOCUMENTS

| | | | |
|---|---|---|---|
| 4,399,028 | 0/1983 | Kile et al. | |
| 4,512,888 | 4/1985 | Flynn | 209/170 |
| 4,749,473 | 6/1988 | Shioiri | 209/170 |

FOREIGN PATENT DOCUMENTS 491410  2/1972  U.S.S.R. ............................... 209/170

Primary Examiner—Peter Hruskoci
Assistant Examiner—Robert J. Popovics
Attorney, Agent, or Firm—Biebel, French & Nauman

[57] ABSTRACT

In froth flotation apparatus for separating solid particle impurities from a liquid suspension stock in a flotation cell, provision is made for aerating the stock flowing through the inlet conduit leading to the cell by positioning a drum-shaped rotor having an irregular outer surface in the conduit on an axis extending transversely of the conduit, directing a supply of air against the rotor surface on the upstream side of its rotational axis, and causing the rotor to rotate at a linear speed of its outer surface which is substantially higher than the linear flow rate of the stock in the conduit so that the rotor surface breaks up the air impinging thereon into bubbles and distributes those bubbles in the stock flowing therepast to create foam within the cell.

7 Claims, 3 Drawing Sheets

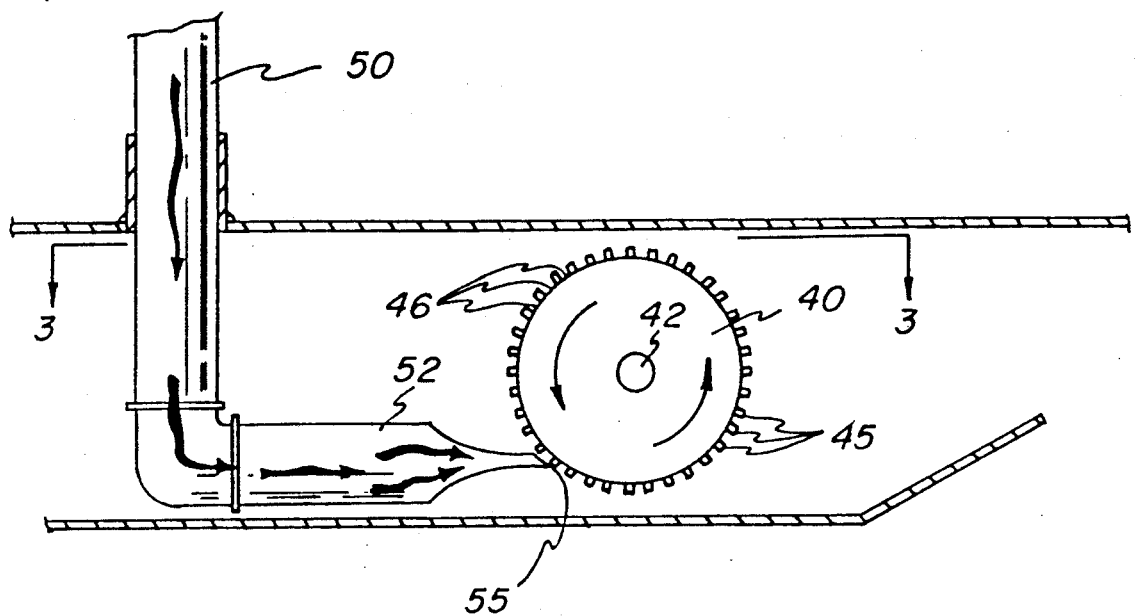
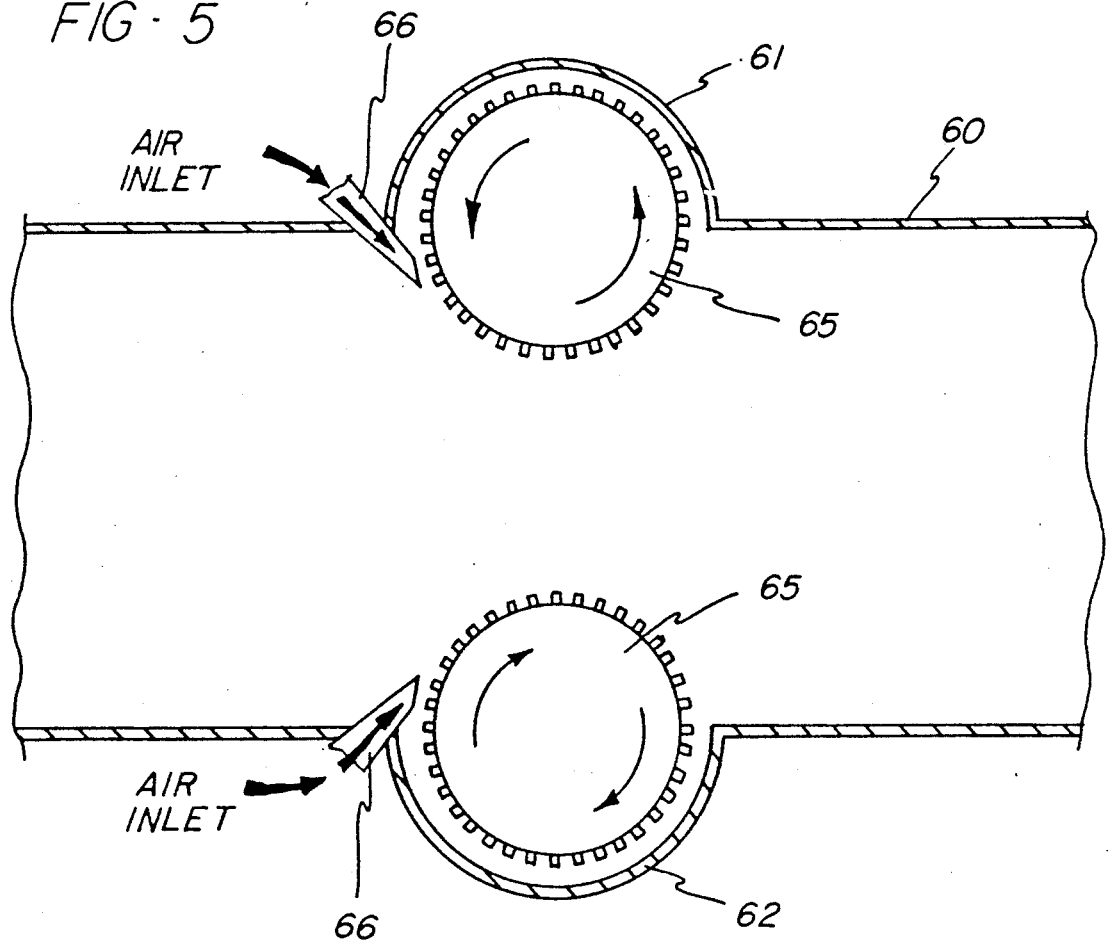

FROTH FLOTATION APPARATUS AND METHOD

BACKGROUND OF THE INVENTION

As is pointed out in the co-owned U.S. Pat. No. 4,399,028, in which one of the present applicants was a co-inventor, froth flotation apparatus is well-known for the separation of small particles from liquid suspension, and the assignee of the present invention is particularly interested in the development and manufacture of froth flotation apparatus for use in the de-inking of waste paper furnishes so that the resulting stock can be reused for the manufacture of paper. For example, the paper making industry presently has great interest in the de-inking of waste white papers, such as ledger papers, to produce a stock which can be used in the manufacture of tissue, and also in the de-inking of used newsprint.

The above patent discloses froth flotation apparatus comprising a generally cylindrical side wall and internal partitions which cooperate to define a plurality of vertically stacked, annular flotation cells surrounding a common discharge conduit for foam. The stock suspension to be de-inked or otherwise cleaned is supplied to the top cell by an inlet which includes provision for aerating the stock as it is delivered into the cell. The contaminant-containing foam which develops on the top of the liquid in the uppermost cell is skimmed off into the foam discharge conduit, while the stock cleaned in passing through that cell is delivered to the next lower cell, again accompanied by aeration, and the same process is repeated in each of the lower cells successively as the stock passes therethrough to the outlet conduit from the lowermost cell.

In that patent, the mechanism for aerating the stock as it is delivered into each cell, which is identified as a "sparger", comprises a hollow cylinder member of porous material, such as sintered bronze, mounted for rotation in the path of the stock suspension being delivered to each cell on an axis extending transversely of the inlet conduit to the cell. Compressed air is supplied to the interior of this cylinder while it is being rotated, and passage of the air through and discharge from the pores in the cylinder produce bubbles which effect the desired aeration of the stock and the creation of foam within the cell.

SUMMARY OF THE INVENTION

The primary purpose of the present invention is to provide an improved sparger mechanism for incorporation in froth flotation apparatus which will provide a highly effective aerating action on the stock delivered to froth flotation apparatus while requiring substantially less power consumption than existing apparatus for the same purpose, and which will at the same time produce more effective mixing of all constituents of the supply stock, including whatever chemicals may be added thereto, than is accomplished by conventional apparatus.

The primary active component of the apparatus of the present invention is a drum-like rotor which is mounted for rotation on an axis extending transversely of the stock inlet conduit to each cell, and which has an irregular outer surface, e.g. multiple circumferentially spaced ribs or other protuberances, capable of a mixing and/or shearing action. The stock inlet conduit is also provided with an air supply conduit extending into it from upstream of the rotor and having a discharge nozzle which extends the full width of the rotor and is positioned in close relation to the surface of the rotor on the upstream side thereof so that only a running clearance is provided therebetween.

In the operation of this apparatus, the liquid stock suspension is delivered to the cell through the inlet conduit at a flow velocity which may be relatively low, but the rotor is driven at a rate which will cause its outer surface to travel at a relatively high linear speed past the outlet end of the air nozzle. This surface passes the nozzle outlet at a desired high speed, thereby simultaneously drawing air from the nozzle into the stock inlet conduit and also mixing that air with the surrounding stock. It has been found in test operations that the result is to produce a tremendous mixing action, not only of air bubbles with the stock but also of all of the constituents of the stock, with the further important advantage of significantly reduced power requirements as compared with prior froth flotation apparatus.

In another embodiment of the invention, two rotors of the characteristics described above are arranged in side-by-side relation across the stock inlet conduit, and a separate air supply conduit is arranged to deliver air to the outer surface of each of these rotors from upstream thereof. Each rotor is driven in the direction which causes it to propel air from its supply conduit into the stock flowing towards the cell so that both rotors directly aerate the stock flowing therepast.

Other objects and advantages of the invention will be apparent from or pointed out in the course of the description of the preferred embodiments thereof which follows.

BRIEF DESCRIPTION OF THE DRAWINGS

FIG. 4 is a greatly enlarged section on the line 4—4 in FIG. 2 and also in FIG. 3; and FIG. 5 is a view similar to FIG. 4 showing another embodiment of the invention.

DESCRIPTION OF THE PREFERRED EMBODIMENTS

Figure 1:
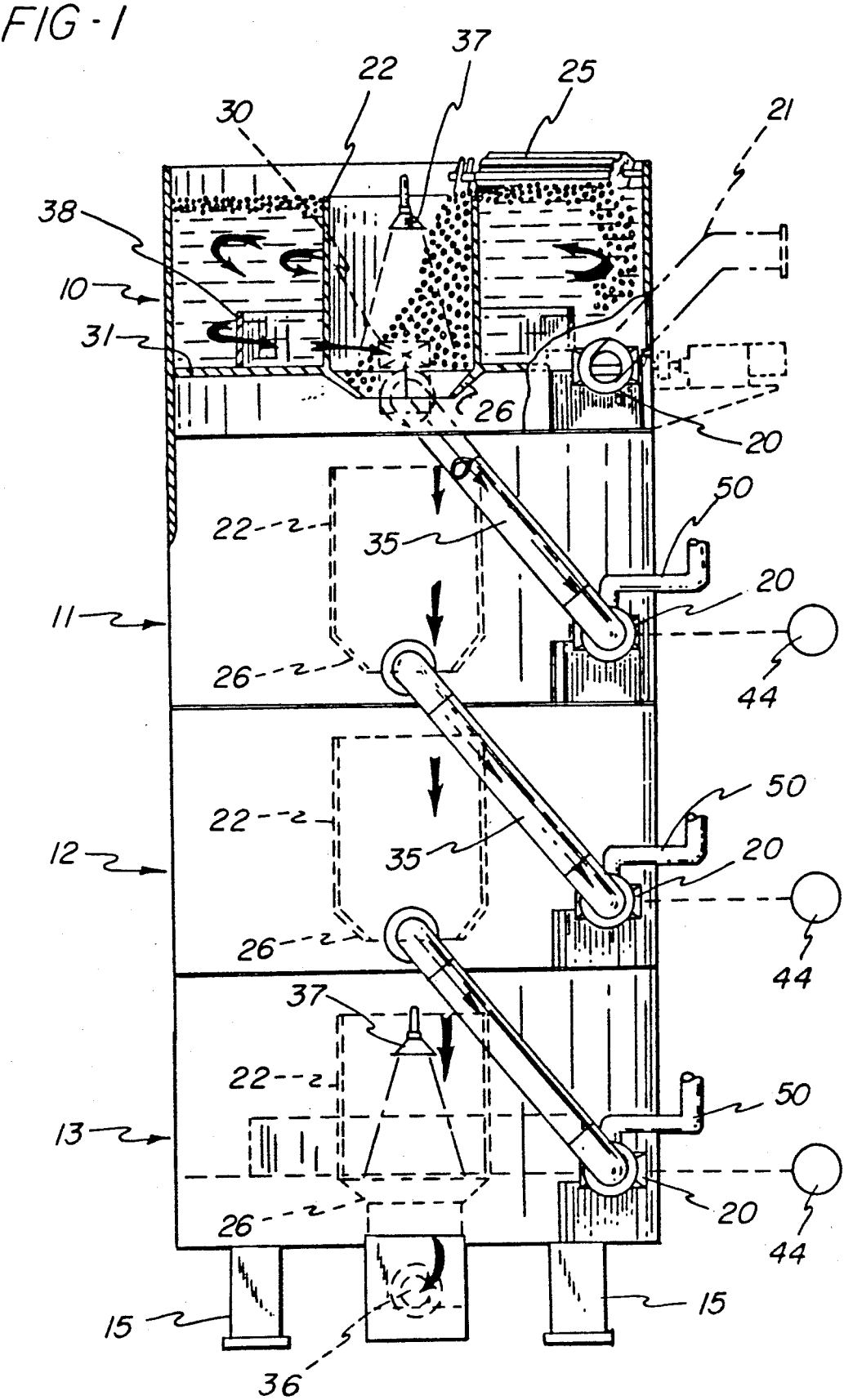
FIG. 1 is a side elevational view, partly broken away, illustrating froth flotation apparatus in accordance with the invention.
Figure 2:
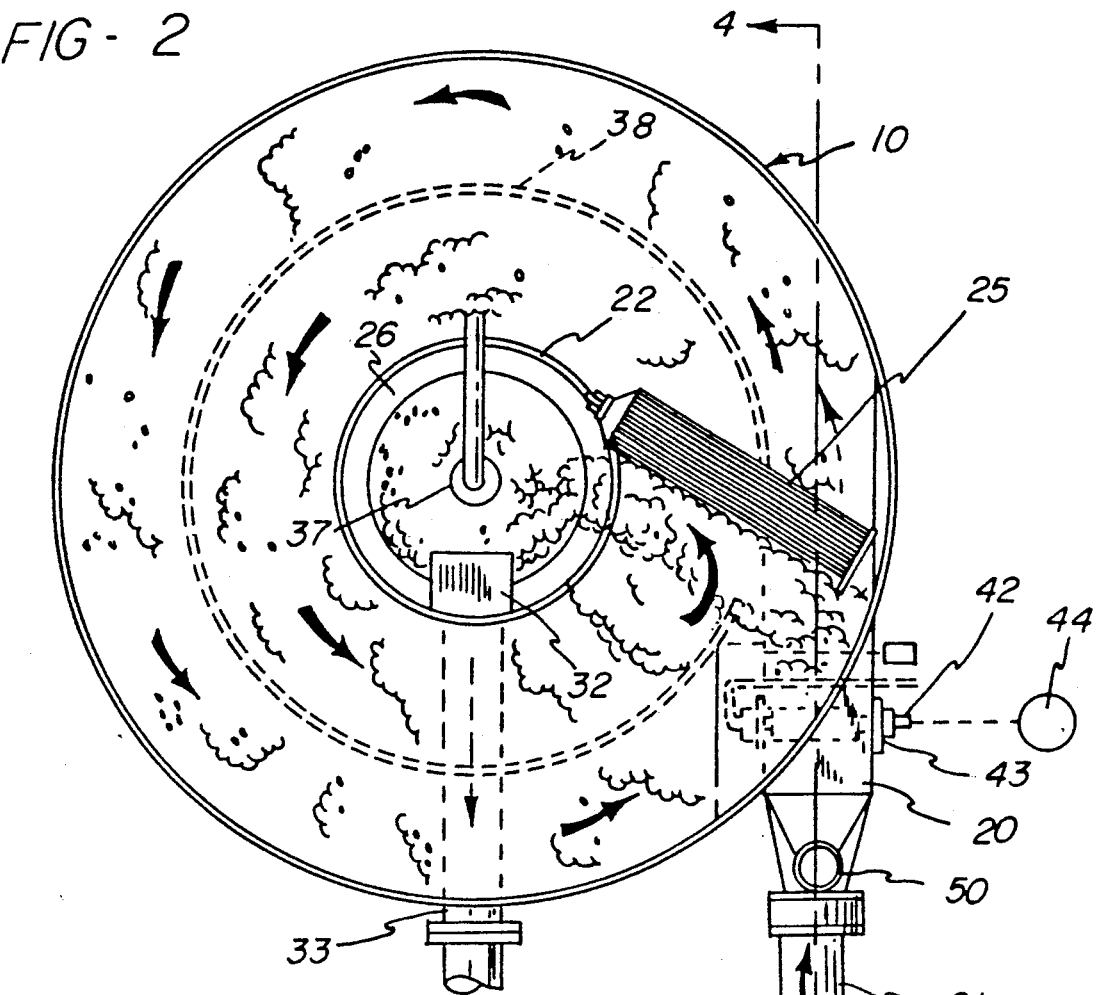
FIG. 2 is a top view of the apparatus shown in FIG. 1.

The overall construction of froth flotation apparatus in accordance with the invention is shown in FIGS. 1 and 2 as a tower comprising four cells 10, 11, 12 and 13 arranged in vertically stacked relation on base structure comprising multiple legs 15. The individual cells 10-13 are each of the same construction, and in operation, the stock suspension to be treated, commonly referred to as "gray" stock, is initially delivered to the uppermost cell 10 and, after cleaning treatment successively in each of the four cells, is discharged as accepted stock from the bottom of the lowermost cell 13.

As the stock is delivered to each successive cell, it is subjected to aeration, and the resulting foam, which rises to the top of the cell, carries contaminant particles with it and is then discharged through conduit means common to all four cells and having an outlet at the bottom of the tower. More specifically, the stock inlet conduit 20 to cell 10 is arranged to deliver the stock tangentially into the bottom portion of the cell 10 from a supply line 21 leading thereto from outside the tower. The inlet conduit 20 has therein the means for aerating the stock as it enters the cell, as described in detail hereinafter.

A tube 22 forms the inner wall of the cell 10, providing it with an annular shape, and also defines the top of the discharge conduit for foam which is common to all four cells. The upper end of the tube 22 forms an overflow outlet for foam from cell 10, and it is therefore spaced below the level of the top of the outer wall of cell 10. A skimming roller 25 moves foam from the top of the liquid in cell 10 into the tube 22, as described in detail in the above U.S. Pat No. 4,399,028, and a funnel section 26 at the bottom of tube 22 delivers this foam to the top of the tube 22 in the next lower cell 11.

Accepted stock flows from the cell 10 through an outlet port 30 located in the wall of tube 22 adjacent the cell bottom wall 31. An elbow 32 leads from this port 30 to a tube 33 leading radially outwardly to the outside of the cell, where it connects with a pipe 35 leading downwardly at an angle to the inlet end of the stock inlet conduit 20 for the cell 11, and the finally accepted stock leaves the bottom cell by a pipe 36. A shower 37 positioned at the top of each of the tubes 22 provides liquid to wash the foam down the conduit defined by the successive tubes 22 and funnel sections 26.

The tangential delivery of the stock into the bottom portion of the cell 10 causes it to travel in a vertical pattern around the interior of the cell, as also guided in part by a cylindrical weir 38, which may have a radius approximately midway between those of the outer wall of the cell and the foam tube 22. This weir prevents incoming stock from short circuiting to the outlet port 30, so that it circulates around the cell long enough for the air bubbles which are mixed therewith as it enters the cell to have time to rise to the surface with the contaminant particles attached thereto.

Figure 3:
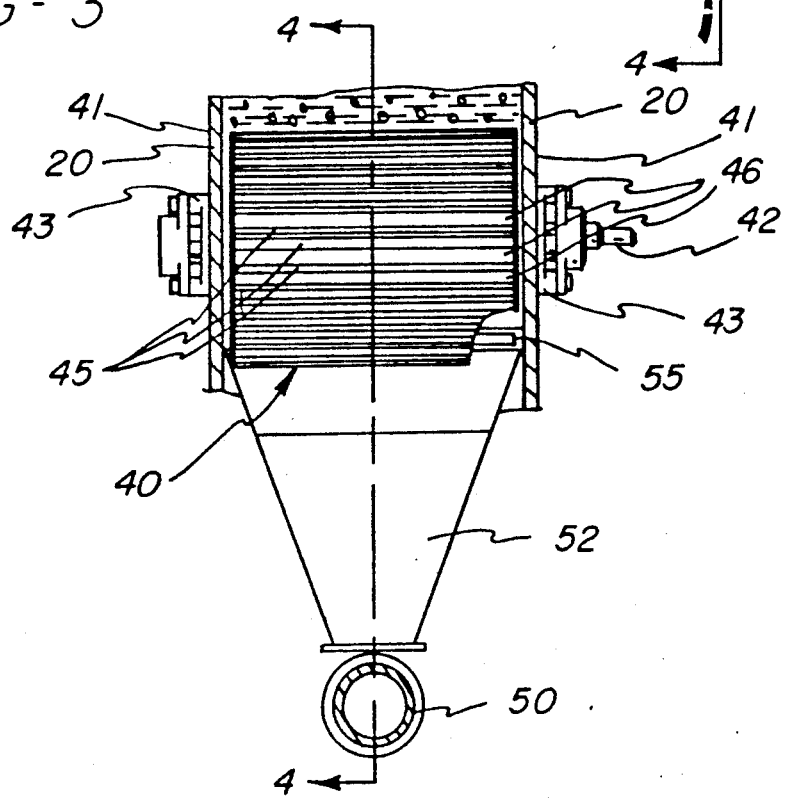
FIG. 3 is a section on the line 3—3 in FIG. 4.

A preferred embodiment of the novel aerating mechanism of the invention is illustrated in FIGS. 3 and 4. Its primary component is a drum-like rotor comprising an imperforate generally cylindrical shell supported by end heads 41 on a shaft 42 mounted by bearings 43 to extend transversely of a rectangular portion of each stock inlet conduit 20 and driven by means such as an electric motor 44.

The outer surface of the rotor shell is provided with multiple protuberances, shown as ribs 45 extending lengthwise of the rotor in circumferentially spaced relation and of sufficient cross sectional dimensions to define a corresponding number of grooves 46 alternating therewith. For example, with the rotor having a diameter of approximately 5 inches and the conduit 20 having a vertical dimension of 8 to 10 inches, successful results have been obtained with ribs 45 of rectangular section having a dimension of 0.155 inch measured radially of the rotor and approximately 0.125 inch measured circumferentially of the rotor, with a space one-half inch wide between adjacent ribs. Other protuberances, such as fins or bumps capable of propelling fluid in their paths, can be used in place of the longitudinal ribs 45.

The other component of the aerating mechanism is an air supply conduit 50 which enters the stock inlet conduit 20 upstream of the rotor 40 and includes a nozzle portion 52 that widens in the direction of flow therethrough to a maximum width equal to the length of the rotor 40. The conduit 50 is positioned in off-center relation with the rotor 40 such that the discharge end 55 of its nozzle portion 52 is closest to the rotor at a position which is approximately mid-way between the axis of the rotor and a plane tangent to the outer surface of the rotor and parallel with a plane through the rotor axis in the direction of flow through the conduit 20. The discharge end 55 of the nozzle 52 is accordingly beveled or rounded to conform as closely as possible with the circle defined by the radially outer surfaces of the ribs 45 while still providing running clearance therebetween.

The upstream end of the air conduit 50 may be open to the atmosphere, or it may be supplied with air under slight super atmospheric pressure by a blower or other supply source. In any event, the operation will be such that when the rotor 40 is rotated at a sufficiently high surface speed, e.g. a speed in the range of 2,000 to 4,000 ft. per minute, the resulting rapid passage of the successive ribs 45 past the nozzle end 55 will draw air from the conduit 20 at a corresponding linear speed, and will discharge this air, along with whatever stock is trapped between the ribs, into the flow of stock through conduit 20 into the associated cell.

If the stock flow is otherwise at a relatively slow linear rate, e.g. 8 to 10 ft. per second, which is a preferred condition, the result is a tremendous mixing action of air with the stock flowing between the rotor and the adjacent wall of conduit 20, which will in turn produce wide distribution of air bubbles in the stock and thereby create the desired foam. In addition, the same mixing action will be effective on whatever chemicals and contaminant particles are present in the stock, such particularly as chemicals conventionally used to precipitate ink as fine contaminant particles.

Among the important advantages achieved by the invention is the comparatively very low power requirements for driving the rotor 40. More specifically, with the conduit 20 and rotor 40 of the dimensions noted above, when the rotor is driven while the air supply thereto is shut off, tests indicate that the power requirement is as much as 10 times greater than when air is being supplied to the air conduit 50. These facts indicate that in operation in accordance with the invention, the rotor 40 is effectively operating in a mantle of air such that it chops that air into fine bubbles which it distributes into the stock flowing therepast, thereby creating the desired foam conditions in the stock as delivered into the associated cell 10.

FIG. 5 shows modified aerating apparatus in accordance with the invention wherein a pair of rotors is incorporated in the stock inlet conduit 60 which otherwise corresponds to the conduit 20. More specifically, each of the upper and lower walls of the conduit includes a semi-cylindrical portion 61, 62 proportioned to enclose the upper or lower half, respectively, of one of the rotors 65, each of which is of essentially the same construction as the rotor 40.

The conduit 60 and the rotors 65 are proportioned to provide a passage for stock flow between the two rotors, and each rotor is provided with its own air inlet nozzle 66 having its discharge end located in the same spatial relation to the associated rotor 65 as described above for the nozzle end 55 and rotor 40. In operation, the two rotors are driven in opposite directions such that their adjacent portions both move in the same direction as the stock flow into the associated cell. Otherwise, the operation of this form of the invention is the same as already described in connection with FIGS. 3 and 4.

While the method herein described, and the forms of apparatus for carrying this method into effect, constitute preferred embodiments of this invention, it is to be understood that the invention is not limited to this precise method and these precise forms of apparatus, and that changes may be made therein without departing from the scope of the invention which is defined in the appended claims.

What is claimed is:

1. In a froth flotation apparatus for separating solid particle impurities from a liquid suspension stock wherein said apparatus includes a vessel defining a flotation cell, means for removing foam from liquid within said cell, means defining an inlet conduit of generally rectangular section for delivering the liquid stock into said vessel, and liquid outlet means from said vessel, improved sparger means for aerating the stock flowing through said inlet conduit to said vessel comprising:
   (a) a drum-shaped rotor having a central axis and mounted for rotation in said inlet conduit with said axis extending transversely of said conduit,
   (b) said rotor having multiple protuberances on the outer surface thereof
   (c) an air supply conduit extending into a portion of said inlet conduit upstream of said rotor,
   (d) said air supply conduit including a discharge nozzle positioned in close relation with the surface of said rotor, and
   (e) means for continuously driving said rotor at a rate of rotation sufficiently high to cause said protuberances on the outer surface thereof to mix air discharged from said nozzle with the stock flowing past said rotor into said cell.

2. Froth flotation apparatus as defined in claim 1 wherein said nozzle is located in a portion of said inlet conduit between a central plane through said rotor parallel with the flow direction through said conduit and a plane tangent to said rotor and parallel with said central plane, and the direction of rotation of said rotor causes said surface thereof to travel from said nozzle toward said tangent plane.

3. Froth flotation apparatus as defined in claim 1 wherein said protrusions on the outer surface of said rotor comprise bars extending axially of said rotor in circumferentially spaced relation with each other on said rotor surface.

4. Froth flotation apparatus as defined in claim 1 further comprising a pair of said rotors, means mounting said rotors with said axes thereof in substantially the same plane extending transversely of the flow direction through said conduit and in spaced relation such that said rotors define a passage therebetween for stock flow to said cell, a pair of said air supply conduits positioned on opposite sides of the longitudinal center of said conduit, and means for driving said rotors in opposite directions such that the surfaces thereof travel in the downstream direction through said flow passage.

5. In a method of removing contaminant particles from a liquid suspension stock by froth flotation in a vessel, the steps of:
   (a) causing said stock to flow through an inlet conduit of generally rectangular section leading to said vessel,
   (b) positioning a drum-shaped rotor having an irregular imperforate outer surface in said conduit for rotation on an axis extending transversely of said conduit,
   (c) directing a supply of air from outside said conduit against said imperforate rotor outer surface on the upstream side of said axis, and
   (d) continuously rotating said rotor at a speed sufficient to break up said air into bubbles and to distribute said bubbles in the stock flowing through said conduit from the vicinity of said rotor to said vessel.

6. In the method defined by claim 5 the further step of causing said rotor to rotate at a linear speed of its said outer surface which is substantially higher than the linear flow rate of said stock in said conduit.

7. In the method of as defined in claim 5 wherein said rotor surface comprises multiple bars extending axially of said rotor of circumferentially spaced relation around said surface.

* * * * *